US010599172B2

(12) United States Patent
Hayashi et al.

(10) Patent No.: US 10,599,172 B2
(45) Date of Patent: Mar. 24, 2020

(54) POWER CIRCUIT

(71) Applicant: RENESAS ELECTRONICS CORPORATION, Tokyo (JP)

(72) Inventors: Kentaro Hayashi, Tokyo (JP); Yutaka Hayashi, Tokyo (JP)

(73) Assignee: RENESAS ELECTRONICS CORPORATION, Tokyo (JP)

( * ) Notice: Subject to any disclaimer, the term of this patent is extended or adjusted under 35 U.S.C. 154(b) by 0 days.

(21) Appl. No.: 16/106,785

(22) Filed: Aug. 21, 2018

(65) Prior Publication Data

US 2019/0107854 A1    Apr. 11, 2019

(30) Foreign Application Priority Data

Oct. 10, 2017    (JP) .................................. 2017-196716

(51) Int. Cl.
*G05F 1/571*    (2006.01)
*G05F 1/56*    (2006.01)
(Continued)

(52) U.S. Cl.
CPC .............. *G05F 1/562* (2013.01); *G05F 1/571* (2013.01); *G05F 1/465* (2013.01); *G05F 1/573* (2013.01);
(Continued)

(58) Field of Classification Search
CPC .......... G05F 1/562; G05F 1/595; G05F 1/465; H02M 2001/0077; H02M 2001/325; H02M 1/32

See application file for complete search history.

(56) References Cited

U.S. PATENT DOCUMENTS 5,786,970 A  *  7/1998  Nao ....................... H02H 3/087
                                                      323/284
7,977,932 B2      7/2011  Morishita
(Continued)

FOREIGN PATENT DOCUMENTS

DE          3806968 A1    7/1989
JP       2009-080653 A    4/2009

OTHER PUBLICATIONS

Extended European Search Report issued in corresponding European Patent Application Na 18193067.8-1201, dated Feb. 22, 2019.
(Continued)

*Primary Examiner* — Gary L Laxton
*Assistant Examiner* — Peter M Novak
(74) *Attorney, Agent, or Firm* — McDermott Will & Emery LLP

(57) ABSTRACT

There is to provide a power circuit capable of stabilizing an internal power source voltage and assuring a normal operation of a load circuit. According to one embodiment, the power circuit includes a regulator which generates an output voltage using an entered input voltage, a voltage detecting circuit which detects the output voltage, and a clamp circuit which outputs an internal power source voltage based on the output voltage and in a first failure that the output voltage is larger than a predetermined first voltage, outputs the internal power source voltage suppressed to the first voltage and less, in which the clamp circuit outputs the internal power source voltage to the logic circuit which operates with the internal power source voltage of the first voltage and less and the voltage detecting circuit outputs the first failure to the logic circuit when detecting the first failure.

11 Claims, 8 Drawing Sheets

(51) Int. Cl.
   *G05F 1/46* (2006.01)
   *H02M 1/32* (2007.01)
   *G05F 1/573* (2006.01)
   *H02M 1/00* (2006.01)

(52) U.S. Cl.
   CPC ...... *H02M 1/32* (2013.01); *H02M 2001/0077* (2013.01); *H02M 2001/325* (2013.01)

(56) References Cited

U.S. PATENT DOCUMENTS

| | | | |
|---|---|---|---|
| 9,946,284 B1* | 4/2018 | Sundstrom | G05F 1/595 |
| 2008/0266739 A1 | 10/2008 | Migliavacca | |
| 2009/0033298 A1* | 2/2009 | Kleveland | G05F 1/575 |
| | | | 323/271 |
| 2009/0206813 A1 | 8/2009 | Agari et al. | |
| 2010/0039304 A1* | 2/2010 | Hsu | H03M 1/808 |
| | | | 341/154 |
| 2011/0163600 A1* | 7/2011 | Garb | H01R 13/6675 |
| | | | 307/35 |
| 2012/0286843 A1 | 11/2012 | Kurokawa | |
| 2013/0151185 A1* | 6/2013 | Yagoshi | G01R 31/31709 |
| | | | 702/64 |
| 2014/0240036 A1 | 8/2014 | Kurokawa | |
| 2018/0026531 A1* | 1/2018 | Nagda | H02M 1/08 |
| | | | 327/109 |

OTHER PUBLICATIONS

European Office Action issued in corresponding European Patent Application No. 18193067.8-1201, dated Jan. 2, 2020.

* cited by examiner

POWER CIRCUIT

CROSS-REFERENCE TO RELATED APPLICATIONS

The disclosure of Japanese Patent Application No. 2017-196716 filed on Oct. 10, 2017 including the specification, drawings and abstract is incorporated herein by reference in its entirety.

BACKGROUND

The invention relates to a power circuit and, for example, to an internal power circuit of an integrated circuit.

Japanese Unexamined Patent Application Publication No. 2009-080653 discloses an internal power circuit capable of supplying a sufficient driving current in response to a fluctuation of a load circuit. The internal power circuit in the above publication includes a regulator so that an internal power source voltage may be supplied to be equal to a reference voltage according to a feedback control. When the power consumption of the load circuit rapidly increases, the circuit quickly supplies a larger current to the load circuit in response to the rapid change. This can suppress a drop of the internal power source voltage.

SUMMARY

When a trouble occurs in a regulator, the output voltage rises in the internal power circuit in Japanese Unexamined Patent Application Publication No. 2009-080653; therefore, the normal operation of a load circuit cannot be assured.

Other problems and novel characteristics will be apparent from the description of the specification and the attached drawings.

According to one embodiment, a power circuit includes: a regulator which generates an output voltage using an entered input voltage; a voltage detecting circuit which detects the output voltage; and a clamp circuit which (i) outputs an internal power source voltage based on the output voltage, and, (ii) in case of a first failure that the output voltage is larger than a predetermined first voltage, outputs the internal power source voltage suppressed to less than or equal to the first voltage. In the above power circuit, the clamp circuit outputs the internal power source voltage to a logic circuit that operates with the internal power source voltage of less than or equal to the first voltage, and the voltage detecting circuit outputs the first failure to the logic circuit when detecting the first failure.

According to one embodiment, it is possible to provide a power circuit capable of stabilizing the internal power source voltage and assuring the normal operation of the load circuit.

DETAILED DESCRIPTION

Figure 1:
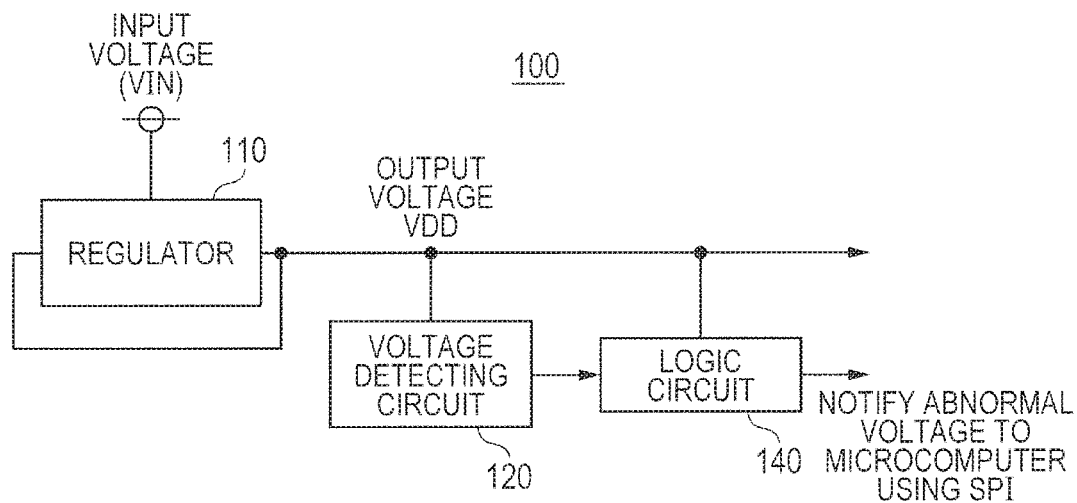
FIG. 1 is a block diagram showing the structure of a power circuit.

For sake of clear description, the following description and drawings are properly omitted and simplified. In each drawing, the same reference numerals are attached to the same elements and the overlapping description is omitted depending on necessity.

At first, the reason why an internal power source voltage in a power circuit rises, found by the inventor et al. will be described. This will clarify a power circuit according to one embodiment.

FIG. 1 is a block diagram showing the structure of a power circuit. As shown in FIG. 1, a power circuit 100 includes a regulator 110 and a voltage detecting circuit 120. The power circuit 100 is, for example, an internal power circuit installed in a semiconductor device, to supply an output voltage VDD for operating the load circuit such as a logic circuit 140.

The regulator 110 generates a predetermined output voltage VDD in response to an input voltage VIN. The input voltage VIN is a voltage supplied from a battery, comparatively high. The input voltage VIN is, for example, 12 [V] to 18 [V]; however, the input voltage VIN is not restricted to this. A part of the output voltage VDD of the regulator 110 is fed back to the regulator 110. Thus, the power circuit 100 includes a negative feedback amplifier.

The output voltage VDD of the regulator 110 becomes a power source for operating the load circuit. The load circuit is an internal circuit of a semiconductor device such as the logic circuit 140 and AMP circuit. The output voltage VDD is set at a voltage in accordance with the absolute maximum rating and the logic operation region and operation speed depending on the process of the logic circuit 140 as the load circuit. The voltage detecting circuit 120 monitors the output voltage VDD.

Considering the functional safety of the whole semiconductor device including the power circuit 100 and a system using the semiconductor device, in the systems and devices disclosed herein, even in the event of a random hardware failure (single failure) in the regulator 110, the function of the system is preferably operated safely. In the power circuit 100 shown in FIG. 1, when a trouble occurs in the regulator 110, the output voltage VDD becomes an extraordinarily high voltage. For example, the output voltage VDD is supposed to rise up to the input voltage VIN. This may exceed the withstand voltage of the logic circuit 140, causing the abnormal operation and trouble and damaging the safety of the system.

As an example of the trouble that can occur in the regulator 110, a scenario is considered in which a short occurs between the drain and source of the output transistor formed within the regulator 110, and that a part of a feedback resistor for generating the output voltage VDD is short-circuited. In the event of these troubles, the output voltage VDD may rise up to the level of the input voltage VIN.

Generally, the power circuit 100 has the voltage detecting circuit 120 which monitors the output voltage VDD. When the output voltage VDD becomes an abnormally high voltage, the voltage detecting circuit 120 notifies it to an external microcomputer through the logic circuit 140 by Serial Peripheral Interface (SPI). In the mode of these troubles, the logic circuit 140 may have been already out of order by the high output voltage VDD. Accordingly, in some cases, it is difficult to notify the voltage abnormality to the microcomputer.

The embodiments described hereinafter will describe a power circuit capable of supplying a stable internal power source voltage so that the function of a system can work safely even in the event of a random hardware failure (single failure).

First Embodiment

Figure 2:
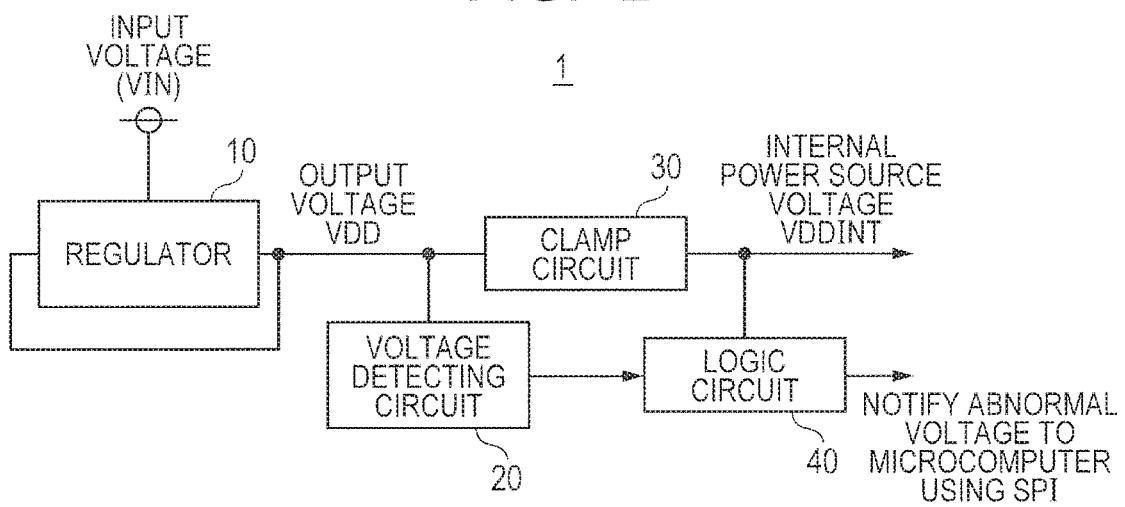
FIG. 2 is a block diagram showing the power circuit according to a first embodiment.

A power circuit according to a first embodiment will be described. At first, the outline of the power circuit will be described. FIG. 2 is a block diagram showing the power circuit according to the first embodiment. As shown in FIG. 2, the power circuit 1 includes a regulator 10, a voltage detecting circuit 20, and a clamp circuit 30.

The regulator 10 generates a predetermined output voltage VDD using an input voltage VIN. The input voltage VIN is a voltage supplied from a battery. A part of the output voltage VDD of the regulator 10 is fed back to the regulator 10. Accordingly, the power circuit 1 includes a negative feedback amplifier.

The voltage detecting circuit 20 is coupled to the regulator 10. The voltage detecting circuit 20 receives the output voltage VDD supplied from the regulator 10. The voltage detecting circuit 20 detects the output voltage VDD. When detecting a failure that the detected output voltage VDD is greater than a predetermined voltage, the voltage detecting circuit 20 outputs the failure to the logic circuit 40. The logic circuit 40 notifies the above failure, for example, to the outside such as a microcomputer, using the SPI.

The clamp circuit 30 is coupled to the regulator 10. The clamp circuit 30 receives the output voltage VDD supplied from the regulator 10. The clamp circuit 30 is coupled to the logic circuit 40. The clamp circuit 30 outputs an internal power source voltage VDDINT, based on the output voltage VDD. The internal power source voltage VDDINT is used for the load circuit such as the logic circuit 40, an AMP control circuit, and a Bias circuit. The internal power source voltage VDDINT becomes a power source of a low withstand voltage element included in the load circuit.

As an example of the clamp circuit 30, a diode clamp structure and a gate clamp structure using the MOSFET are taken. The clamp circuit is formed in a circuit independent of the regulator 10. The clamp circuit 30 does not operate in a normal mode. The normal mode means the normal case where the regulator 10 generates the output voltage VDD of a predetermined voltage and less. In the normal mode, the output voltage VDD supplied from the regulator 10 is equal to the internal power source voltage VDDINT (output voltage VDD=internal power source VDDINT).

On the other hand, in the abnormal case where the entered output voltage VDD is larger than the predetermined voltage, the clamp circuit 30 outputs the internal power source voltage VDDINT suppressed to the predetermined voltage and less to the logic circuit 40. When the output voltage VDD is larger than the predetermined voltage, for example, a random hardware failure occurs in the regulator 10. The predetermined voltage is, for example, the voltage of the absolute maximum rating and less of the logic circuit 40. Further, the predetermined voltage is the voltage for operating the logic circuit. According to this, the clamp circuit 30 becomes a clamping means for suppressing the internal power source voltage VDDINT to a predetermined voltage.

By passing the output voltage VDD supplied from the regulator 10 through the clamp circuit 30, the logic circuit 40 can be operated with the voltage of the absolute maximum rating and less. According to this, even in the event of a random hardware failure (single failure) in the regulator 10, the internal power source voltage VDDINT can be restricted to the voltage of the absolute maximum rating and less of the logic circuit 40. As the result, the logic circuit 40 operating with the voltage of the predetermined voltage and less is not affected by the trouble of the regulator 10. The normal operation of the logic circuit 40 can be assured.

Figure 3:
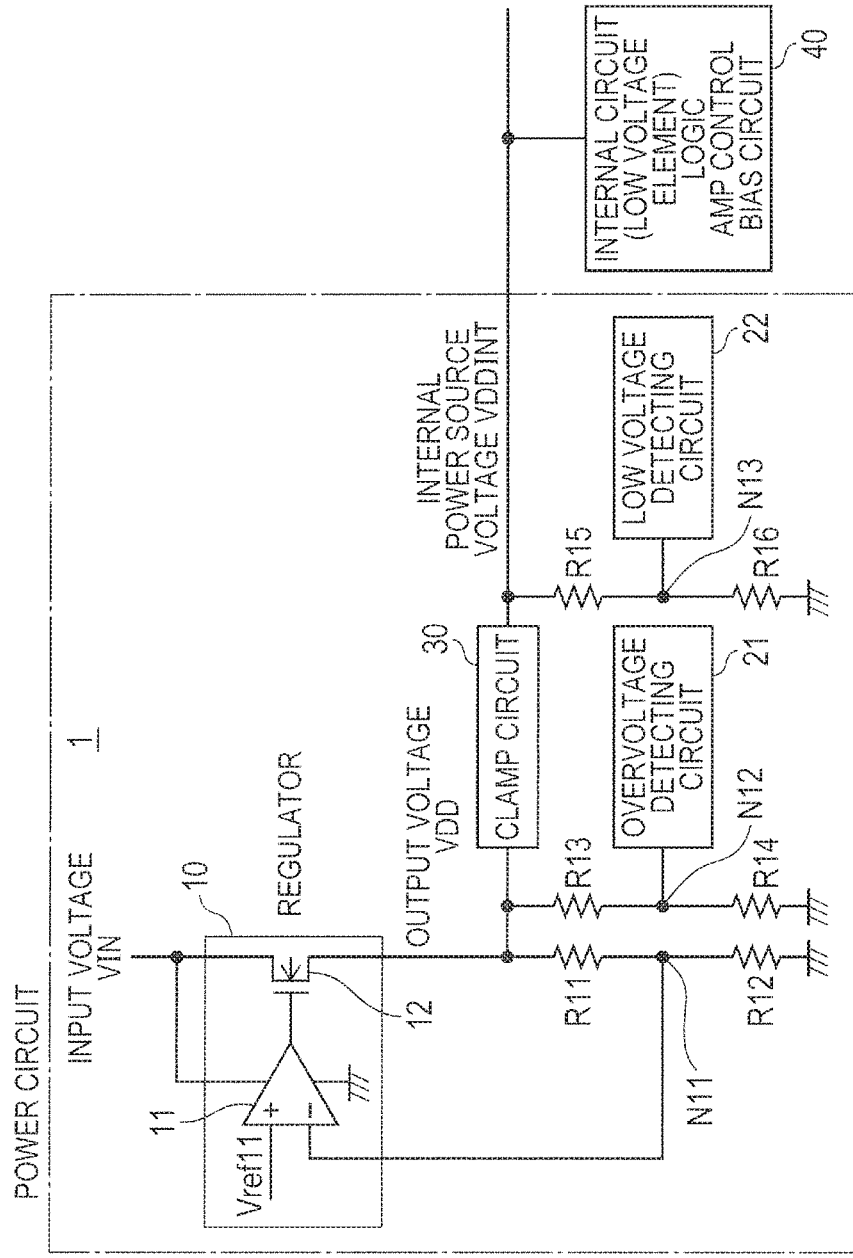
FIG. 3 is a block diagram showing the details of the power circuit according to the first embodiment.

Next, the power circuit 1 is specifically described. FIG. 3 is a block diagram showing the details of the power circuit 1 according to the first embodiment. As shown in FIG. 3, the power circuit 1 includes the regulator 10, a plurality of voltage detecting circuits 21 and 22, the clamp circuit 30, and resistors R11 to R16. The power circuit 1 may include other circuits than these if necessity arises in the operation.

The regulator 10 includes an Operational Amplifier 11 and an output transistor 12. The input voltage VIN is coupled to the positive electrode terminal of the operational amplifier 11. The negative power terminal of the operational amplifier 11 is grounded. A reference voltage Vref11 is coupled to the (+) input terminal. The reference voltage Vref11 is supplied from, for example, a reference voltage generating circuit not shown.

A part of the output voltage VDD is coupled to the (−) input terminal. Thus, the regulator 10 includes a negative feedback amplifier where a part of the output voltage VDD is fed back. The output of the operational amplifier 11 is coupled to the gate of the output transistor 12.

The input side of the output transistor 12 is coupled to the input voltage VIN. The gate of the output transistor 12 is coupled to the output of the operational amplifier 11. The output side of the output transistor 12 is coupled to the clamp circuit 30. According to this, the output voltage VDD is supplied to the clamp circuit 30. The output transistor 12 is, for example, an N-type MOS transistor.

The output side of the output transistor 12 is grounded through the resistors R11 and R12 having a predetermined resistor value. The (−) input terminal of the operational amplifier 11 is coupled to a contact point N11 of the resistor R11 and the resistor R12. According to this, a part of the output voltage VDD is fed back to the regulator 10 through the resistors R11 and R12 working as a feedback resistor. Specifically, a part of the output voltage VDD supplied from the output transistor 12 is fed back to the (−) input terminal of the negative feedback amplifier through the feedback resistors R11 and R12.

According to this, the output voltage VDD supplied from the regulator 10 is kept at a voltage level of operating the logic circuit 40. For example, the output voltage VDD shown in the following formula (1) is supplied. The output voltage VDD is, for example, 3.3 [V].

$$VDD = Vref11 \cdot (R11 + R12)/R12 \qquad (1)$$

The power circuit 1 may include a plurality of voltage detecting circuits 20. For example, the voltage detecting circuit 20 includes an overvoltage detecting circuit 21 and a low voltage detecting circuit 22. The overvoltage detecting circuit 21 is coupled to the output side of the output transistor 12 through the predetermined resistor R13. The output side of the output transistor 12 is grounded through the predetermined resistors R13 and R14. The overvoltage detecting circuit 21 is coupled to a contact point N12 between the resistor R13 and the resistor R14.

When detecting a failure that the output voltage VDD is larger than the predetermined voltage, the overvoltage detecting circuit 21 outputs the failure to the logic circuit 40. The logic circuit 40 notifies the failure to the outside.

Specifically, the overvoltage detecting circuit 21 includes, for example, a comparator. The resistors R13 and R14 work as a ladder resistor. The overvoltage detecting circuit 21 divides the output voltage VDD by the resistors R13 and R14. The divided output voltage VDD is compared with the reference voltage. When the output voltage VDD becomes the predetermined voltage (for example, 6.0 [V]), the output of the comparator is inverted. The overvoltage detecting circuit 21 outputs the inverted output to the logic circuit 40. The reference voltage for the overvoltage detecting circuit 21 is preferably supplied from the reference voltage generating circuit independent of that one supplying the reference voltage of the regulator 10.

The low voltage detecting circuit 22 may be coupled to the clamp circuit 30. The low voltage detecting circuit 22 is coupled to the clamp circuit 30 through the resistor R15. The clamp circuit 30 is grounded through the resistors R15 and R16. The low voltage detecting circuit 22 is coupled to a contact point N13 between the resistor R15 and the resistor R16. Accordingly, the resistors R15 and R16 work as a ladder resistor. The low voltage detecting circuit 22 detects the internal power source voltage VDDINT supplied from the clamp circuit 30. When the low voltage detecting circuit 22 detects a failure that the internal power source voltage VDDINT is less than the predetermined voltage, it outputs the failure to the logic circuit 40. The logic circuit 40 notifies the failure to the outside. The logic circuit 40 notifies the failure to the external microcomputer through the SPI.

In the event of a random hardware failure (single failure) in the clamp circuit 30, the clamp circuit 30 occasionally fails in outputting the predetermined internal power source voltage VDDINT based on the output voltage VDD. In this case, the internal power source VDDINT gets less than the predetermined voltage. The low voltage detecting circuit 22 which detects the internal power source voltage VDDINT outputs the failure of the clamp circuit 30 to the logic circuit 40. The logic circuit 40 notifies the failure to the external microcomputer using the SPI. For example, each power source is compulsorily stopped according to Power On Reset (POR).

Figure 4:
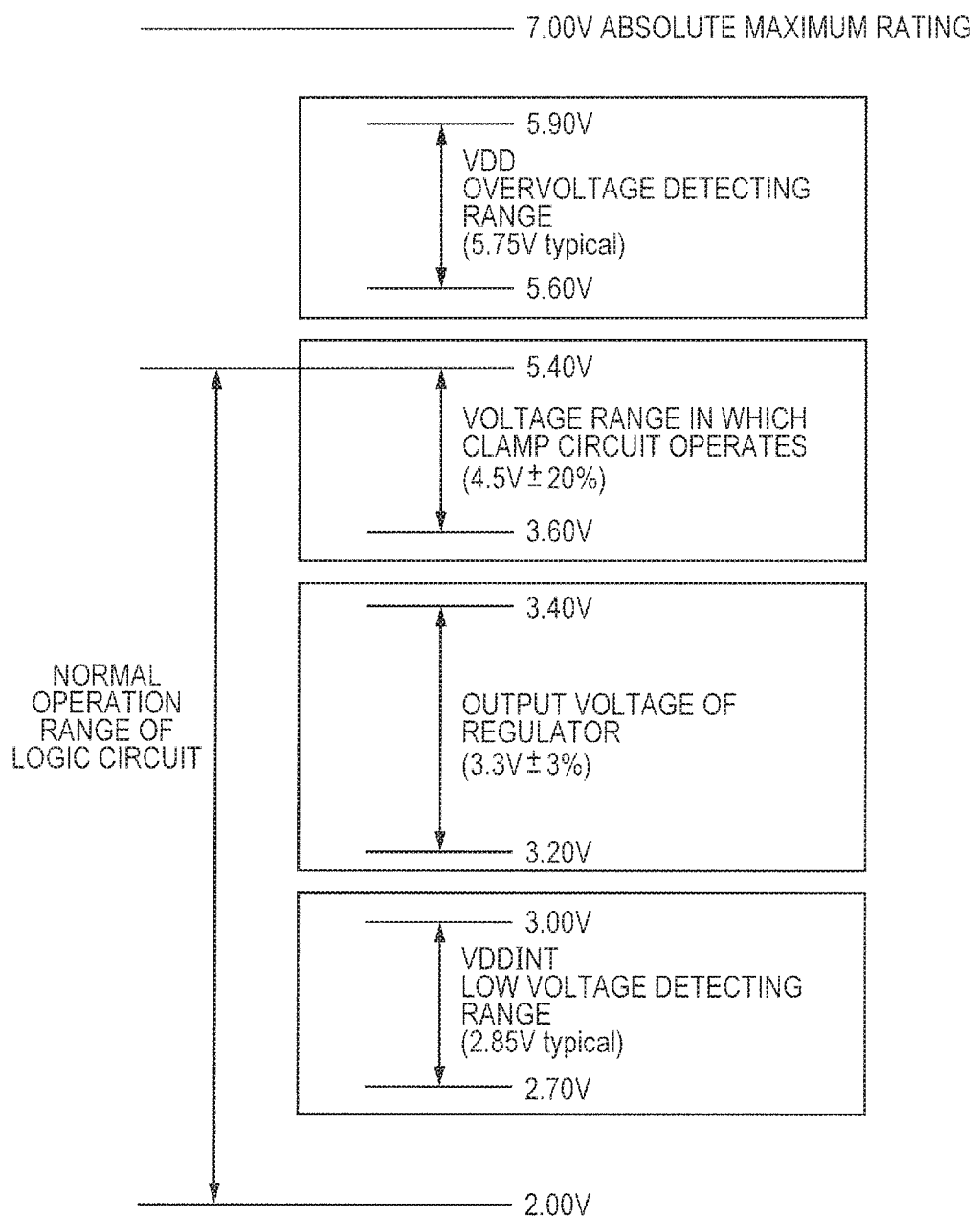
FIG. 4 is a view showing a voltage setting range in the power circuit according to the first embodiment.

FIG. 4 is a view showing a voltage setting range in the power circuit according to the first embodiment. As shown in FIG. 4, the voltage range in which the clamp circuit 30 operates, the output voltage VDD of the regulator 10, the detecting range of the overvoltage detecting circuit 21, and the detecting range of the low voltage detecting circuit 22 are set so that the internal power source voltage VDDINT can be within the normal operation range of the logic circuit 40.

The normal operation range of the logic circuit 40 is, for example, 2.00 [V] to 5.40 [V]. The output voltage VDD of the regulator 10 is set so as to operate the logic circuit 40 normally. When the output voltage VDD of the regulator 10 is set at 3.3 [V]±3 [%], the output voltage VDD supplied from the regulator 10 is, for example, in the voltage range of 3.20 [V] to 3.40 [V]. During the normal operation of the regulator 10, the logic circuit 40 can operate normally.

Next, the voltage range in which the clamp circuit 30 operates is set. Since the normal operation range of the logic circuit 40 is 2.00 [V] to 5.40 [V], the clamp circuit 30 is set to suppress the internal power source voltage VDDINT to 5.40 [V] and less. With the predetermined voltage as a first voltage, the voltage of the upper limit in the normal operation range of the logic circuit 40 is selected. When the output voltage VDD of operating the clamp circuit 30 is set at 4.5 [V]±20 [%], the clamp circuit 30 clamps the output voltage VDD and the internal power source voltage VDDINT to output is in the voltage range of 3.60 [V] to 5.40 [V].

Even when the output voltage VDD larger than the first voltage is supplied according to a trouble of the regulator 10, the internal power source voltage VDDINT can be suppressed to the absolute maximum rating voltage and less of the logic circuit 40. As mentioned above, in the abnormal case where the output voltage VDD is larger than the first voltage, the internal power source voltage VDDINT supplied from the clamp circuit 30 is the absolute maximum rating voltage and less of the low withstand element included in the logic circuit 40. More preferably, the internal power source voltage VDDINT supplied from the clamp circuit 30 in the abnormal case is the voltage of the upper limit and less in the normal operation range of the logic circuit 40.

Further, the clamp circuit 30 is set to start the operation with the voltage larger than the output voltage VDD during the normal operation of the regulator 10. For example, the output voltage VDD of the regulator 10 is, for example, in the voltage range of 3.20 [V] to 3.40 [V]. The internal power source voltage VDDINT supplied from the clamp circuit 30 after starting the operation is in the voltage range of 3.60 [V] to 5.40 [V]. Accordingly, the output voltage VDD (3.20 [V] to 3.40 [V]) supplied from the regulator 10 during the normal operation of the regulator is less than the internal power source voltage VDDINT (3.60 [V] to 5.40 [V]) supplied from the clamp circuit 30 in the abnormal case of the regulator 10.

The overvoltage detecting circuit 21 is set to detect the output voltage VDD larger than the normal operation range of the logic circuit 40. For example, the overvoltage detecting voltage is set at 5.75 [V] and the detecting range is set at 5.60 [V] to 5.90 [V]. When detecting the output voltage VDD in the detecting range, the overvoltage detecting circuit 21 outputs the failure to the logic circuit 40.

The low voltage detecting circuit 22 is set to detect the internal power source voltage VDDINT lower than the output voltage VDD of the regulator 10. For example, as a second voltage, a voltage lower than the output voltage VDD of the regulator 10 is selected. For example, the low voltage detecting voltage is set at 2.85 [V] and the detecting range is set at 2.70 [V] to 3.00 [V]. When detecting the internal power source voltage VDDINT in the detecting range, the low voltage detecting circuit 22 outputs the failure to the logic circuit 40.

Next, the effects of the embodiment will be described.

The power circuit 1 according to the embodiment includes the clamp circuit 30 intended to suppress the internal power source voltage VDDINT to a predetermined voltage and less. Accordingly, the internal power source voltage VDDINT can be stabilized and the normal operation of the load circuit such as the logic circuit 40 can be assured.

The voltage range in which the clamp circuit 30 operates is set larger than the output voltage VDD in the normal operation mode of the regulator 10. Therefore, in the event of a random hardware failure in the regulator 10, the clamp circuit 30 can be operated assuredly.

Further, the internal power source voltage VDDINT supplied from the clamp circuit 30 is set at the absolute maximum rating voltage and less of the low withstand element included in the logic circuit 40. Therefore, even in the trouble time, the logic circuit 40 can be operated normally.

When detecting a failure, the voltage detecting circuit 20 outputs the failure to the logic circuit 40 and the logic circuit 40 notifies the failure to the outside. Thus, it is possible to notify a failure considering the functional safety.

The regulator 10 includes a negative feedback amplifier to which a part of the output voltage VDD is fed back. According to this, a fluctuation of the output voltage VDD can be suppressed, hence to improve the stability of the output voltage VDD.

The clamp circuit 30 is formed in a circuit independent of the regulator 10. According to this, even in the event of a random hardware failure in the regulator 10, the clamp circuit 30 can suppress the internal power source voltage VDDINT to a predetermined voltage and less with which the logic circuit 40 operates normally.

Second Embodiment

Figure 5:
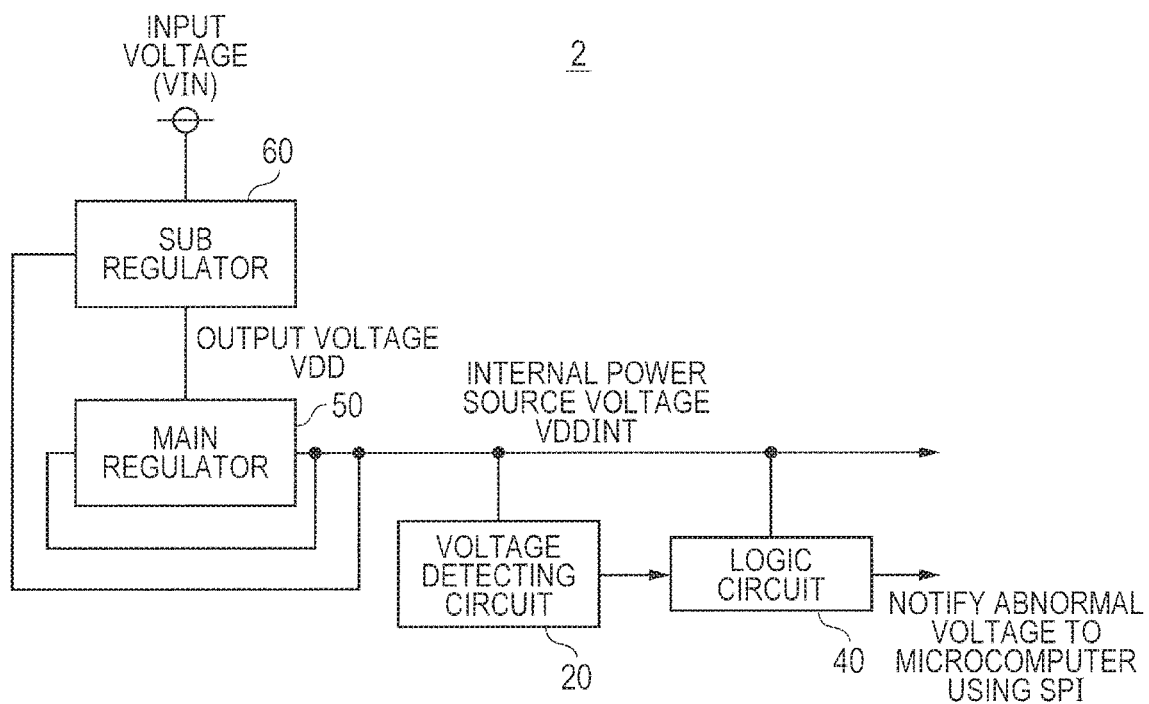
FIG. 5 is a block diagram showing a power circuit according to a second embodiment.

Next, a power circuit according to a second embodiment will be described. FIG. 5 is a block diagram showing the power circuit according to the second embodiment. As shown in FIG. 5, the power circuit 2 according to the second embodiment includes a main regulator 50, a sub regulator 60, and a voltage detecting circuit 20.

The sub regulator 60 generates a predetermined output voltage VDD according to an entered input voltage VIN. The main regulator 50 is coupled to the sub regulator 60. The main regulator 50 receives the output voltage VDD supplied from the sub regulator 60. In the normal mode, the sub regulator 60 does not operate. The sub regulator 60 outputs the output voltage VDD equal to the input voltage VIN (output voltage VDD=input voltage VIN), in response to the entered input voltage VIN.

The main regulator 50 is coupled to the logic circuit 40. The main regulator 50 generates a predetermined internal power source voltage VDDINT using the output voltage VDD. The main regulator 50 outputs the internal power source voltage VDDINT to the logic circuit 40. The internal power source voltage VDDINT is used, for example, for the internal circuit such as a logic circuit 40, an AMP control circuit, and a Bias circuit. The internal power source voltage VDDINT becomes the power source of the low withstand element included in the logic circuit 40. A part of the internal power source voltage VDDINT is fed back to the main regulator 50 and the sub regulator 60. According to this, the main regulator 50 and the sub regulator 60 include the negative feedback amplifiers to which a part of the internal power source voltage VDDINT is fed back.

The voltage detecting circuit 20 is coupled to the main regulator 50. The voltage detecting circuit 20 receives the internal power source voltage VDDINT supplied from the main regulator 50. The voltage detecting circuit 20 detects the internal power source voltage VDDINT. When the monitored internal power source voltage VDDINT becomes larger than a predetermined voltage, the voltage detecting circuit 20 outputs the failure to the logic circuit 40. The logic circuit 40 notifies the failure to an external microcomputer through SPI.

When the main regulator 50 is normal, the main regulator 50 generates the internal power source voltage of a predetermined voltage and less. When the main regulator 50 has a random hardware failure, the main regulator 50 outputs the internal power source voltage VDDINT larger than the predetermined voltage. Thus, it becomes in the abnormal state where the internal power source voltage VDDINT is larger than the predetermined voltage.

In the case of the abnormal state, the main regulator 50 is automatically switched to the sub regulator 60. The sub regulator 60 generates the output voltage VDD so that the internal power source voltage VDDINT may be suppressed to the predetermined voltage and less. According to this, the internal power source voltage VDDINT is restricted to the absolute maximum rating voltage and less of the low withstand element of the logic circuit 40. Thus, the sub regulator 60 becomes a clamping means for suppressing the internal power source voltage VDDINT to the predetermined voltage.

When the main regulator 50 breaks down, the voltage detecting circuit 20 detects a change of the internal power source voltage VDDINT. The internal power source voltage VDDINT supplied from the main regulator 50 in the normal mode is smaller than the internal power source voltage VDDINT supplied according to the operation of the sub regulator 60 in the abnormal mode. The voltage detecting circuit 20 detects the internal power source voltage VDDINT when the sub regulator 60 operates. According to this, the voltage detecting circuit 20 detects a failure caused by the trouble of the main regulator 50. The voltage detecting circuit 20 supplies the failure to the logic circuit 40. The logic circuit 40 notifies the failure to the outside.

According to this, the power circuit 2 of the embodiment has two independent regulators. Also in the event of a random hardware failure (single failure) in the main regulator 50, the sub regulator 60 restricts the internal power source voltage VDDINT to the absolute maximum rating voltage and less of the logic circuit 40. This can suppress a trouble in the logic circuit 40 and assure the normal operation of the logic circuit 40.

The power circuit 2 according to the second embodiment can cope with the lowering voltage of the low withstand element, compared with the power circuit 1 according to the first embodiment. According to a fine process rule, the operation voltage of the power circuit 2 is lowered. The degree of the lower voltage operation depends on the absolute maximum rating of the low withstand element forming the power circuit 2, the voltage range in which the logic circuit operates, and the operation speed of the logic circuit.

The clamp circuit 30 in the first embodiment is in the gate clamp structure using a diode clamp structure and MOSFET. In the case of this structure, a fluctuation in the characteristics of the elements forming the clamp circuit 30 causes a comparatively large fluctuation of the internal power source voltage VDDINT supplied from the clamp circuit 30. Accordingly, in the case of the clamp circuit 30, it is difficult to cope with the lower voltage.

In the first embodiment, the voltage in the normal operation is set at 3.3 [V], while the absolute maximum rating is set at 7.0 [V]. It is comparatively easy to make the clamp circuit 30 cope with this voltage setting. Even when the output of the clamp circuit 30 has a fluctuation of 20%, the clamp circuit 30 can cope with the absolute maximum rating 7.0 [V] and less.

On the other hand, it is difficult to make the clamp circuit 30 cope with the logic circuit 40 with the absolute maximum rating of the low withstand element reduced according to a fine process rule. According to the width of the output of the clamp circuit 30, there is a possibility of exceeding the absolute maximum rating.

On the contrary, the power circuit 2 according to the second embodiment includes the main regulator 50 and the sub regulator 60, instead of the clamp circuit 30. The regulator can supply a stable output of less fluctuation.

Accordingly, the power circuit 2 can cope with the logic circuit 40 in which the absolute maximum rating of the low withstand element is reduced.

Figure 6:
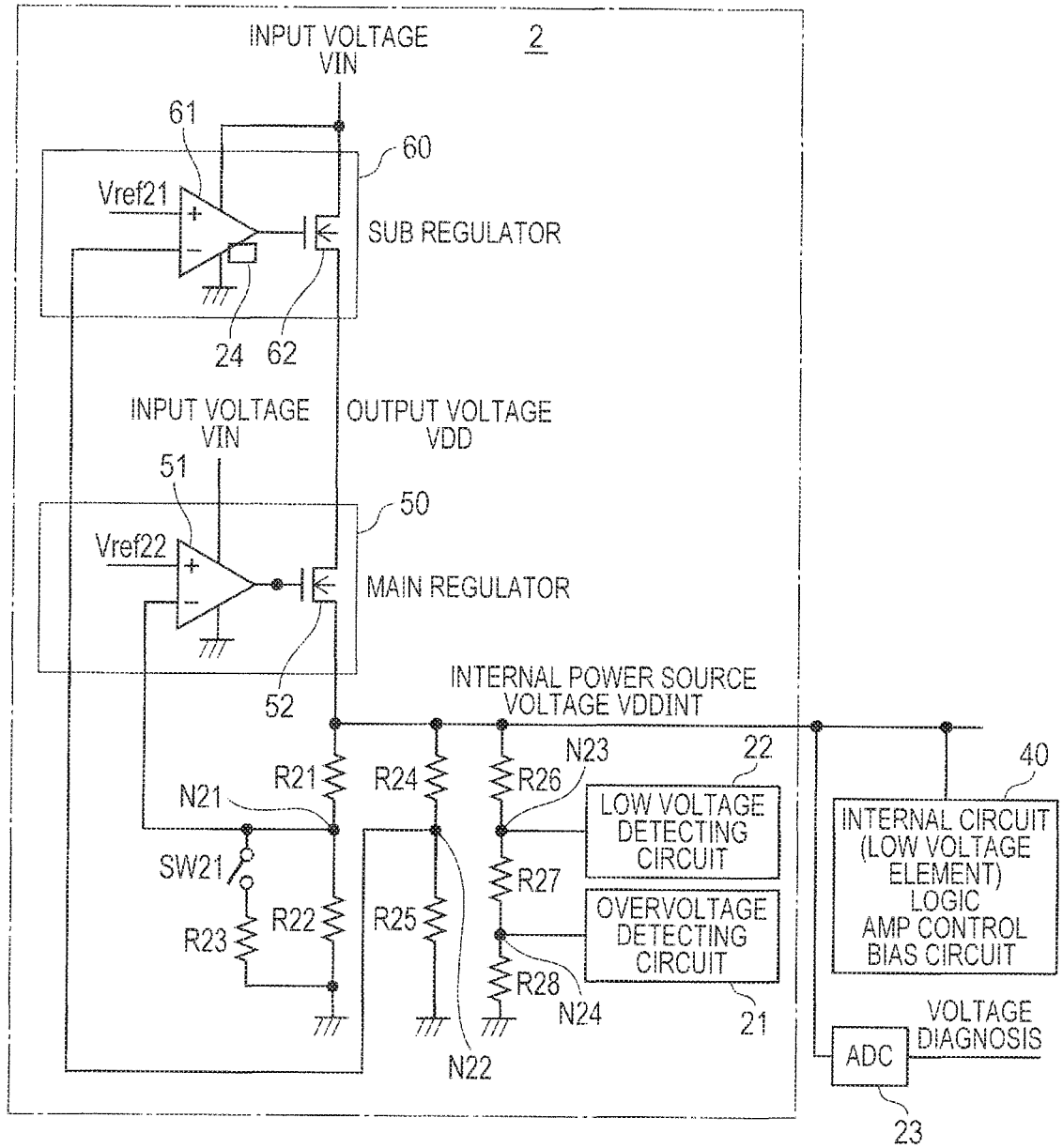
FIG. 6 is a block diagram showing the details of the power circuit according to the second embodiment.

Next, the details of the power circuit 2 according to the second embodiment will be described. FIG. 6 is a block diagram showing the details of the power circuit according to the second embodiment. As shown in FIG. 6, the power circuit 2 of the second embodiment includes the main regulator 50, the sub regulator 60, an overvoltage detecting circuit 21, a low voltage detecting circuit 22, and resistors R21 to R28. The main regulator 50 includes an operational amplifier 51 and an output transistor 52. The sub regulator 60 includes an operational amplifier 61 and an output transistor 62. The voltage detecting circuit 20 includes the overvoltage detecting circuit 21 and the low voltage detecting circuit 22.

In the sub regulator 60, the input voltage VIN is coupled to the electrode terminal on the positive side of the operational amplifier 61. The power terminal on the negative side of the operational amplifier 61 is grounded. A reference voltage Vref21 is coupled to the (+) input terminal. The reference voltage Vref21 is supplied, for example, from a reference voltage generating circuit not shown.

A part of the internal power source VDDINT supplied from the main regulator 50 is coupled to the (−) input terminal of the operational amplifier 61. The output of the operational amplifier 61 is coupled to the gate of the output transistor 62.

The input side of the output transistor 62 is coupled to the input voltage VIN. The gate of the output transistor 62 is coupled to the output of the operational amplifier 61 in the sub regulator 60. The output side of the output transistor 62 is coupled to the input side of the output transistor 52 in the main regulator 50.

In the main regulator 50, the electrode terminal on the positive side of the operational amplifier 51 is coupled to the input voltage VIN. The power terminal on the negative side of the operational amplifier 51 is grounded. A reference voltage Vref22 is coupled to the (+) input terminal. The reference voltage Vref22 is supplied, for example, from a reference voltage generating circuit not shown.

A part of the internal power source VDDINT supplied from the main regulator 50 is coupled to the (−) input terminal of the operational amplifier 51. The output of the operational amplifier 51 is coupled to the gate of the output transistor 52.

The input side of the output transistor 52 is coupled to the output side of the output transistor 62. According to this, the output voltage VDD is supplied to the input side of the output transistor 52. The gate of the output transistor 52 is coupled to the output of the operational amplifier 51 in the main regulator 50. The output side of the output transistor 52 is coupled to the internal circuit including the logic circuit 40. Thus, the internal power source voltage VDDINT is supplied to the logic circuit 40.

Further, the output side of the output transistor 52 is grounded through the resistors R21 and R22. The (−) input terminal of the operational amplifier 51 is coupled to a contact point N21 between the resistor R21 and the resistor R22. According to this, the output of the output transistor 52 is fed back to the operational amplifier 51 through the feedback resistors R21 and R22. The contact point N21 is grounded through a switch SW21 and the resistor R23.

Further, the output side of the output transistor 52 is grounded through the resistors R24 and R25. The (−) input terminal of the operational amplifier 61 is coupled to a contact point N22 between the resistor R24 and the resistor R25. According to this, the output of the output transistor 52 is fed back to the operational amplifier 61 through the feedback resistors R24 and R25.

The both regulators are such negative feedback amplifiers that a part of the internal power source voltage VDDINT is fed back to the (−) input terminal of the operational amplifier 61 in the sub regulator 60 and the (−) input terminal of the operational amplifier 51 in the main regulator 50. Thus, the power circuit 2 is formed in a structure with the two regulators connected in series (dependent connection), with the sub regulator 60 added to the main regulator 50 in consideration of the functional safety. The main regulator 50 and the sub regulator 60 are designed to feed back the internal power source voltage VDDINT. The sub regulator 60 and the main regulator 50 are formed independently. In other words, for example, the reference voltages Vref21 and Vref22 used and the reference current are designed to run in the separate circuits independent of each other.

In the normal operation mode, the sub regulator 60 does not operate. The output transistor 62 is in full on (Full ON) state. Therefore, the power circuit 2 operates only with the main regulator 50. The power circuit 2 generates the internal power source voltage VDDINT of a predetermined voltage.

On the other hand, in the event of a trouble in the main regulator 50, it is automatically switched to the sub regulator 60. The sub regulator 60 restricts the internal power source voltage VDDINT to the absolute maximum rating voltage and less of the low withstand element included in the logic circuit 40.

As a trouble of the main regulator 50, for example, when the output transistor 52 is fixed ON, a part of the feedback resistors R21 to R22 is short-circuited to the ground side. In the case of this trouble, the internal power source voltage VDDINT rises. However, when the internal power source voltage VDDINT becomes the setting voltage of the sub regulator 60, the sub regulator 60 starts the operation. The internal power source VDDINT is suppressed to the absolute maximum rating voltage and less. As the result, the internal power source VDDINT supplied from the power circuit 2 is kept at a voltage level at which the logic circuit 40 operates normally.

The main regulator 50 outputs the internal power source voltage VDDINT shown in the following formula (2), in response to the input voltage VIN.

$$\text{VDDINT} = V\text{ref22} \cdot (R21 + R22)/R22 \qquad (2)$$

The sub regulator 60 outputs the internal power source voltage VDDINT shown in the following formula (3), in response to the input voltage VIN.

$$\text{VDDINT} = V\text{ref21} \cdot (R24 + R25)/R25 \qquad (3)$$

A relation between the internal power source voltage VDDINT supplied form the main regulator 50 and the output voltage VDD supplied from the sub regulator 60 is as follows.

voltage level supplied from the main regulator 50<voltage level supplied from the sub regulator 60<voltage level of absolute maximum rating of low withstand element   (4)

When a single failure occurs in the operational amplifier 51 and the output transistor 52 forming the main regulator 50, the reference voltage circuit, and the output feedback resistors R21 and R22, the internal power source voltage VDDINT is restricted by the sub regulator 60. According to this, the internal power source voltage VDDINT is suppressed to the absolute maximum rating and less of the low withstand element included in the logic circuit 40.

The sub regulator 60 is also formed in the negative feedback amplifier to which the internal power source voltage VDDINT is fed back. When the sub regulator 60 operates, the sub regulator 60 can output the internal power source voltage VDDINT with the fluctuation suppressed.

The low voltage detecting circuit 22 is coupled to the output side of the output transistor 52 through the resistor R26. The output side of the output transistor 52 is grounded through a ladder resistor including the resistors R26 to R28. The low voltage detecting circuit 22 is coupled to a contact point N23 between the resistor R26 and the resistor R27. The low voltage detecting circuit 22 detects the internal power source voltage VDDINT. When detecting such a failure that the internal power source voltage VDDINT is less than the predetermined voltage, the low voltage detecting circuit 22 outputs the failure to the logic circuit 40. The logic circuit 40 notifies the failure to the external microcomputer through the SPI.

Further, the overvoltage detecting circuit 21 is coupled to the output side of the output transistor 52 through the resistors R26 and R27. The overvoltage detecting circuit 21 is coupled to a contact point N24 between the resistors R27 and R28. The overvoltage detecting circuit 21 detects the internal power source voltage VDDINT. When detecting such a failure that the internal power source voltage VDDINT is larger than the predetermined voltage, the overvoltage detecting circuit 21 outputs the failure to the logic circuit 40. The logic circuit 40 notifies the failure to the external microcomputer through the SPI.

Specifically, the overvoltage detecting circuit 21 and the low voltage detecting circuit 22 include, for example, comparators. For example, the overvoltage detecting circuit 21 and the low voltage detecting circuit 22 divide the internal power source voltage VDDINT by the resistors R26 to R28. The divided internal power source voltage VDDINT is compared with the reference voltage. When the internal power source voltage VDDINT becomes the predetermined voltage, the output of the comparator is inverted. The overvoltage detecting circuit 21 and the low voltage detecting circuit 22 output the inverted output to the logic circuit 40. The reference voltage of the voltage detecting circuit 20 is preferably supplied from the reference voltage generating circuit independent of that one supplying the reference voltage of the regulator 10.

Figure 7:
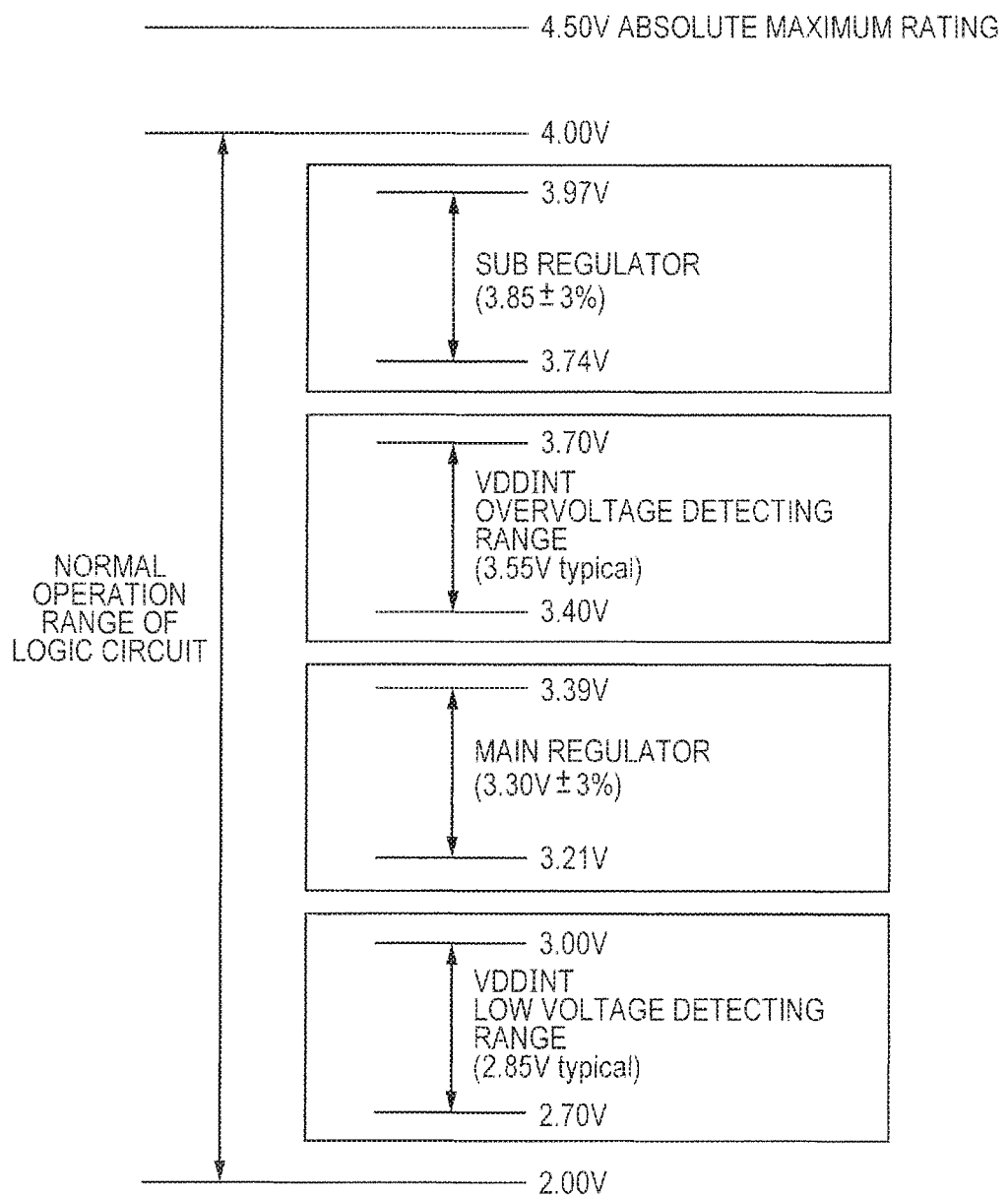
FIG. 7 is a view showing a voltage setting range in the power circuit according to the second embodiment.

FIG. 7 is a view showing the voltage setting in the power circuit according to the second embodiment. As shown in FIG. 7, the internal power source voltage VDDINT supplied from the main regulator 50, the voltage range in which the sub regulator 60 operates, and the detecting range of the overvoltage detecting circuit 21 and the low voltage detecting circuit 22 are set so that the internal power source voltage VDDINT may be within the normal operation range of the logic circuit 40.

The normal operation range of the logic circuit 40 is, for example, 2.00 [V] to 4.00 [V]. At first, the internal power source voltage VDDINT supplied from the main regulator 50 is set so that the logic circuit 40 may operate normally. When the internal power source VDDINT of the main regulator 50 is set at 3.30 [V]±3%, the internal power source voltage VDDINT supplied from the main regulator 50 is, for example, in the voltage range of 3.21 [V] to 3.39 [V]. During the normal operation of the main regulator 50, the logic circuit 40 can also operate normally. On the other hand, with the upper value in the voltage range of the main regulator 50 defined as a third potential, when the internal power source voltage VDDINT is larger than the third voltage, the main regulator 50 is abnormal.

Next, the voltage range in which the sub regulator 60 operates is set. Since the normal operation range of the logic circuit 40 is 2.00 [V] to 4.00 [V], the sub regulator 60 is set to suppress the internal power source voltage VDDINT to 4.00 [V] and less. For example, with the internal power source voltage VDDINT of operating the sub regulator 60 set at 3.85 [V]±3%, the sub regulator 60 outputs the internal power source VDDINT to be within the voltage range of 3.74 [V] to 3.97 [V]. With the upper limit of the voltage range of the sub regulator 60 defined as a fourth potential, when the main regulator 50 has a failure, the sub regulator 60 generates the output voltage so that the internal power source voltage VDDINT may be suppressed to the fourth voltage and less. The fourth voltage is larger than the third voltage.

Therefore, even in the event of a trouble in the main regulator 50, the internal power source voltage VDDINT can be suppressed to the absolute maximum rating voltage and less of the logic circuit 40.

The sub regulator 60 is set to start the operation with the voltage larger than the internal power source voltage VDDINT during the normal operation of the main regulator 50. For example, the internal power source voltage VDDINT of the main regulator 50 is in the voltage range of 3.21 [V] to 3.39 [V]. Further, the internal power source voltage VDDINT of the sub regulator 60 is in the voltage range of 3.74 [V] to 3.97 [V]. Accordingly, the internal power source voltage VDDINT of the third voltage and less supplied from the main regulator 50 during the normal operation thereof is less than the internal power source voltage VDDINT supplied from the operation of the sub regulator 60 in the abnormal operation of the main regulator 50.

The overvoltage detecting circuit 21 is set to detect with the voltage larger than the internal power source voltage VDDINT of the main regulator 50. For example, the overvoltage detecting voltage is set at 3.55 [V] and the detecting range is set at 3.40 [V] to 3.70 [V]. When the internal power source voltage VDDINT rises due to a trouble of the main regulator 50, the overvoltage detecting circuit 21 detects the abnormal internal power source voltage VDDINT and outputs the abnormal state to the logic circuit 40. The logic circuit 40 notifies the above to the external microcomputer using the SPI.

The low voltage detecting circuit 22 is set to detect with the voltage smaller than the internal power source voltage VDDINT of the main regulator 50. For example, the low voltage detecting voltage is set at 2.85 [V] and the detecting range is set at 2.70 [V] to 3.00 [V]. The low voltage detecting circuit 22 notifies the abnormal internal power source voltage VDDINT and outputs the failure to the logic circuit 40. The logic circuit 40 notifies the failure to the external microcomputer using the SPI.

Further, when the absolute maximum rating of the low withstand element gets lower according to the fine process, not only the overvoltage detecting circuit 21 and the low voltage detecting circuit 22 but also the Analog-Digital Converter (ADC) 23 of detecting the internal power source voltage may be used to perform the voltage diagnosis on the internal power source voltage VDDINT. According to this, the detecting voltage range at the trouble time can be set finely.

The random hardware failure of the sub regulator 60 can be detected by periodically detecting the state of the sub regulator 60. For example, as shown in FIG. 6, the switch SW21 is used to do a Built-in Self Test (BIST). In this case, the feedback resistors R21 to R23 become a variable resistor capable of making the internal power source voltage VDDINT generated by the main regulator 50 larger than the predetermined voltage. Then, the voltage level of the operational amplifier 51 in the main regulator 50 is changed (raised). According to this, the operation of the sub regulator 60 starts and then the voltage state of the operational amplifier 61 can be diagnosed according to the voltage state of the overvoltage detecting circuit 21, the low voltage detecting circuit 22, and the ADC23.

Alternatively, the sub regulator 60 may be provided with a current detecting circuit 24 for detecting current of the operational amplifier 61 and the current detecting circuit 24 can detect a trouble of the sub regulator 60. The current detecting circuit 24 notifies the failure through the logic circuit 40 at the trouble time of the sub regulator 60.

Next, the effects of the embodiment will be described.

The power circuit 2 of the embodiment includes the sub regulator 60 for the purpose of suppressing the internal power source voltage VDDINT to a predetermined voltage and less. As the result, the internal power source voltage VDDINT can be stabilized, and the normal operation of the load circuit such as the logic circuit 40 can be assured.

The voltage range in which the sub regulator 60 operates is set larger than the internal power source voltage VDDINT supplied during the normal operation of the main regulator 50. In the event of a random hardware failure in the main regulator 50, the internal power source voltage VDDINT can be assuredly suppressed to the predetermined voltage and less.

The internal power source voltage VDDINT supplied during the operation of the sub regulator 60 is set at the absolute maximum rating voltage and less of the low withstand element included in the logic circuit 40. As the result, also in the trouble time, the logic circuit 40 can be operated normally.

When the overvoltage detecting circuit 21 and the low voltage detecting circuit 22 detect a failure, they output the failure to the logic circuit 40 and the logic circuit 40 notifies the failure to the outside. As the result, the failure can be notified considering the functional safety.

The main regulator 50 and the sub regulator 60 include the negative feedback amplifiers to which a part of the internal power source voltage VDDINT is fed back. This can suppress the fluctuation of the internal power source voltage VDDINT and improve the stability of the internal power source voltage VDDINT.

By using the BIST, a trouble of the sub regulator 60 can be detected. For example, as a structure of detecting a trouble of the clamp circuit 30 in the first embodiment, for example, the clamp circuit 30 itself is made redundant to reduce a failure rate. In this case, however, their occupied area on a chip gets larger. On the contrary, in the power circuit 2 according to the second embodiment, the sub regulator 60 can be used as it is, and therefore, it is not necessary to enlarge the occupied area on a chip. Further, using the BIST, a trouble can be detected during the operation of the power circuit 2.

In addition to the overvoltage detecting circuit 21 and the low voltage detecting circuit 22, the ADC23 can make a voltage diagnosis and the current detecting circuit 24 can detect a failure. According to this, a trouble of the main regulator 50 and the sub regulator 60 can be detected.

The sub regulator 60 and the main regulator 50 are respectively formed in independent circuits. Each reference voltage used for the regulators and the voltage detecting circuit 20 is independent of each other. According to this, even in the event of a random hardware failure in the main regulator 50, the sub regulator 60 can output the internal power source voltage VDDINT of operating the logic circuit 40 normally. The structure and effects other than this are included in the first embodiment.

Third Embodiment

Figure 8:
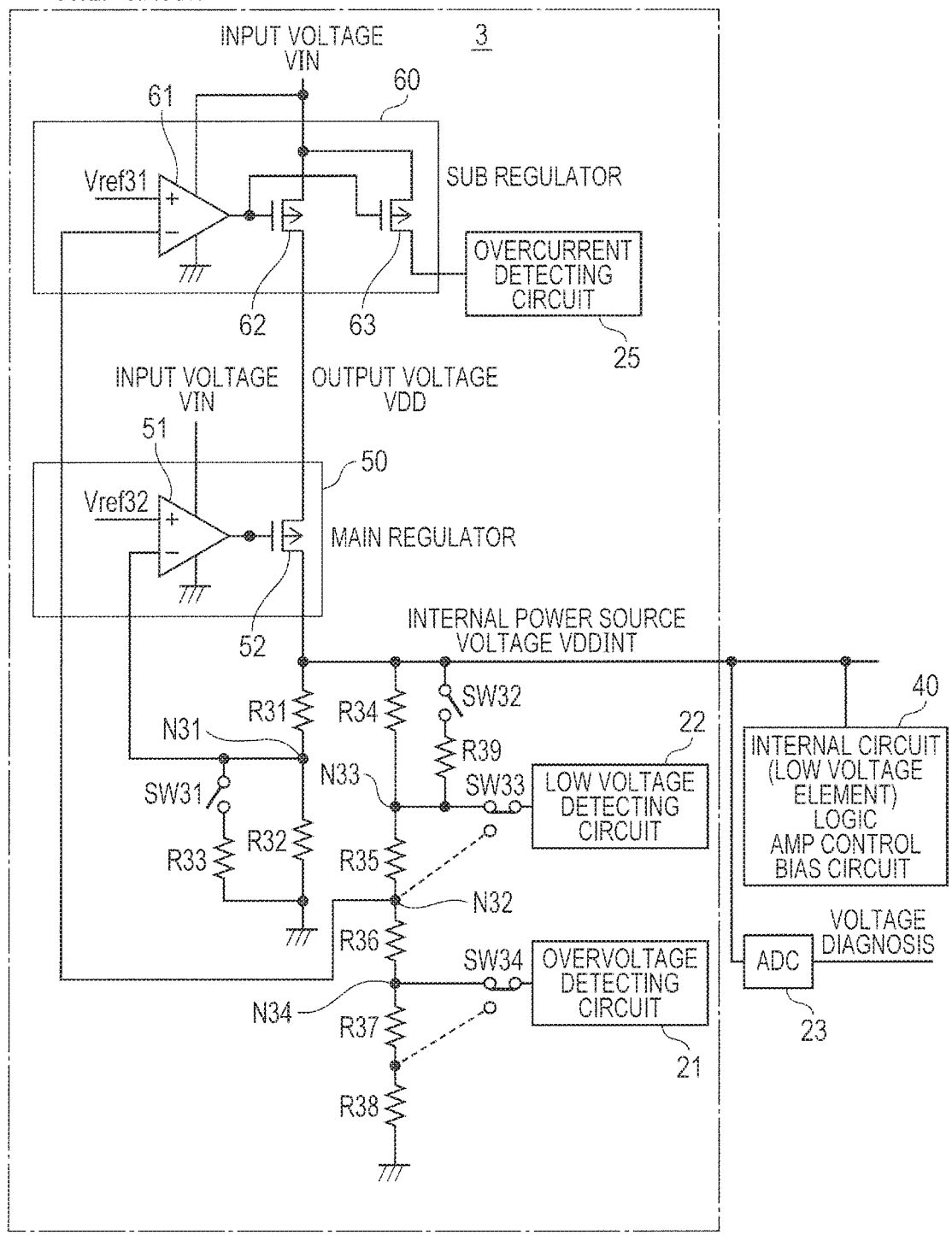
FIG. 8 is a block diagram showing a power circuit according to a third embodiment.

A third embodiment will be described. FIG. 8 is a block diagram showing a power circuit according to the third embodiment. As shown in FIG. 8, a power circuit 3 includes a main regulator 50, a sub regulator 60, an overvoltage detecting circuit 21, a low voltage detecting circuit 22, and resistors R31 to R39. The main regulator 50 includes an operational amplifier 51 and an output transistor 52. The sub regulator 60 includes an operational amplifier 61, an output transistor 62, a detecting transistor 63, and an overcurrent detecting circuit 25.

In the sub regulator 60, the input voltage VIN is coupled to the electrode terminal on the positive side of the operational amplifier 61. The power terminal on the negative side of the operational amplifier 61 is grounded. A reference voltage Vref31 is coupled to the (+) input terminal of the operational amplifier 61. The reference voltage Vref31 is supplied from, for example, a reference voltage generating circuit not shown.

A part of the internal power source voltage VDDINT supplied from the main regulator 50 is coupled to the (−) input terminal of the operational amplifier 61. The output of the operational amplifier 61 is coupled to the gate of the output transistor 62 and the gate of the detecting transistor 63.

The output transistor 62 and the detecting transistor 63 are, for example, PMOS transistors. The input side of the output transistor 62 is coupled to the input voltage VIN. The gate of the output transistor 62 is coupled to the output of the operational amplifier 61 in the sub regulator 60. The output side of the output transistor 62 is coupled to the input side of the output transistor 52 in the main regulator 50.

The input side of the detecting transistor 63 is coupled to the input voltage VIN. The gate of the detecting transistor 63 is coupled to the output of the operational amplifier 61 in the sub regulator 60. The output side of the detecting transistor 63 is coupled to the overcurrent detecting circuit 25.

In the main regulator 50, the input voltage VIN is coupled to the electrode terminal on the positive side of the operational amplifier 51. The power terminal on the negative side of the operational amplifier 51 is grounded. A reference voltage Vref32 is coupled to the (+) input terminal of the operational amplifier 51. The reference voltage Vref32 is supplied from, for example, a reference voltage generating circuit not shown.

A part of the internal power source voltage VDDINT supplied from the main regulator 50 is coupled to the (−) input terminal of the operational amplifier 51. The output of the operational amplifier 51 is coupled to the gate of the output transistor 52.

The input side of the output transistor 52 is coupled to the output side of the output transistor 62. According to this, the input side of the output transistor 52 receives the output voltage VDD. The gate of the output transistor 52 is coupled to the output of the operational amplifier 51 in the main regulator 50. The output side of the output transistor 52 is coupled to the internal circuit such as the logic circuit 40. According to this, the internal power source voltage VDDINT is supplied to the logic circuit 40.

The output side of the output transistor 52 is grounded through the resistors R31 and R32. The (−) input terminal of the operational amplifier 51 is coupled to a contact point N31 between the resistors R31 and R32. The contact point N31 is grounded through a switch SW31 and the resistor R33.

Further, the output side of the output transistor 52 is grounded through the resistors R34 to R38. The (−) input terminal of the operational amplifier 61 is coupled to a contact point N32 between the resistors R34 and R35 and the resistors R36 to R38.

The low voltage detecting circuit 22 is coupled to the output side of the output transistor 52 through the resistor R34. The output side of the output transistor 52 is grounded through a ladder resistor including the resistors R34 to R38. The low voltage detecting circuit 22 is coupled to a contact point N33 between the resistor R34 and the resistor R35. The low voltage detecting circuit 22 detects the internal power source voltage VDDINT. When detecting such a failure that the internal power source voltage VDDINT is less than a predetermined voltage, the low voltage detecting circuit 22 outputs the failure to the logic circuit 40. The logic circuit 40 notifies the failure to the external microcomputer through the SPI. Further, a switch SW32 and the resistor R39 are coupled in parallel with the resistor R34.

The overvoltage detecting circuit 21 is coupled to the output side of the output transistor 52 through the resistors R34 to R36. The overvoltage detecting circuit 21 is coupled to a contact point N34 between the resistor R36 and the resistor R37. The overvoltage detecting circuit 21 detects the internal power source voltage VDDINT. When detecting such a failure that the internal power source voltage VDDINT is larger than the predetermined voltage, the overvoltage detecting circuit 21 outputs the failure to the logic circuit 40.

The overvoltage detecting circuit 21 and the low voltage detecting circuit 22 include, for example, comparators. For example, the overvoltage detecting circuit 21 and the low voltage detecting circuit 22 divide the internal power source voltage VDDINT by the resistors R34 to R38. The divided internal power source voltage VDDINT is compared with the reference voltage. When the internal power source voltage VDDINT becomes the predetermined voltage, the output of the comparator is inverted. The overvoltage detecting circuit 21 and the low voltage detecting circuit 22 output the inverted output to the logic circuit 40. The reference voltage for exclusive use of the overvoltage detecting circuit 21 is preferably supplied from the reference voltage generating circuit independent of that one supplying the reference voltage for the main regulator 50.

The feedback resistors R31 to R38 are variable resistors capable of making the internal power source voltage VDDINT generated by the main regulator 50 larger than the output voltage generated by the sub regulator 60. Therefore, according to the BIST using the switches SW31 and SW32, the internal power source voltages VDDINT supplied from the main regulator 50 and the sub regulator 60 can be inverted.

Figure 9:
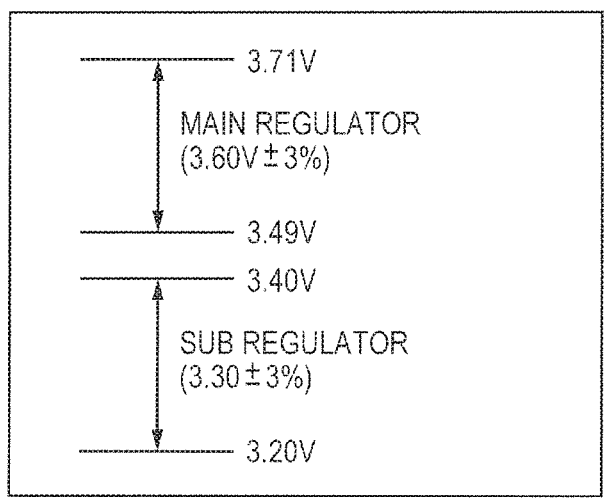
FIG. 9 is a view showing a voltage setting range at the BIST in the power circuit according to the third embodiment.

FIG. 9 is a view showing the voltage setting range at the BIST in the power circuit according to the third embodiment. As shown in FIG. 9, at the BIST time, when the internal power source VDDINT of the main regulator 50 is set at 3.60 [V]±3%, the internal power source voltage VDDINT supplied from the main regulator 50 is, for example, in the voltage range of 3.49 [V] to 3.71 [V]. When the internal power source VDDINT of the sub regulator 60 is set at 3.30 [V]±3%, the internal power source voltage VDDINT output by the sub regulator 60 is, for example, in the voltage range of 3.20 [V] to 3.40 [V].

As mentioned above, according to the BIST method, each internal power source voltage VDDINT output by the main regulator 50 and the sub regulator 60 is changed, hence to detect a trouble of the sub regulator 60. Even when the absolute maximum rating becomes a lower voltage according to the miniaturization of the integrated circuit, the BIST method can detect a trouble of the sub regulator 60.

Next, the effects of the embodiment will be described. In the embodiment, the feedback resistors R31 to R38 are variable resistors. Accordingly, by inverting each internal power source voltage VDDINT supplied from each regulator, it is possible to detect a trouble of the sub regulator 60.

Further, the ladder resistor of R34 to R38 used for comparison of the internal power source voltage VDDINT by the overvoltage detecting circuit 21 and the low voltage detecting circuit 22 may be shared with the sub regulator 60 as the feedback resistor. In other words, the voltage detecting circuits 21 and 22 may detect the internal power source voltage VDDINT through the ladder resistor of R34 to R38 and the sub regulator 60 may feed back a part of the internal power source voltage VDDINT through the ladder resistor of R34 to R38. In this case, the occupied area of the power circuit 3 on a chip can be reduced.

The sub regulator 60 includes the overcurrent detecting circuit 25 which detects an overcurrent from the output of the detecting transistor 63. According to this, even in the event of a trouble in the sub regulator 60, the above circuit can detect the trouble to avoid a short and a ground fault.

The output transistors 52 and 62 may be formed in PMOS structure. Therefore, as shown in the first to third embodiments, the output transistors 52 and 62 may be NMOS or may be PMOS and a general transistor can be used for the regulator. The other structure and effects than these are included in the description of the first and second embodiments.

Although the invention made by the inventor et al. has been described based on the embodiments, the invention is not restricted to the above mentioned embodiments but needless to say, various modifications are possible in the range without departing from its spirit.

What is claimed is:

1. A power circuit comprising:
   a sub regulator which generates an output voltage using an entered input voltage;
   a main regulator which generates an internal power source voltage using the output voltage; and
   a voltage detecting circuit which detects the internal power source voltage,
   wherein, in a failure in which the internal power source voltage is larger than a predetermined first voltage, the sub regulator generates the output voltage so that the internal power source voltage is suppressed to a voltage less than or equal to a second voltage that is larger than the first voltage,
   wherein the main regulator outputs the internal power source voltage to a logic circuit which operates with the internal power source voltage of less than or equal to the second voltage, and
   wherein when detecting the failure, the voltage detecting circuit outputs the failure to the logic circuit and the logic circuit notifies the failure to outside circuitry,
   wherein the main regulator includes a first negative feedback amplifier and a first output transistor having a gate coupled to an output of the first negative feedback amplifier, wherein the sub regulator includes a second negative feedback amplifier and a second output transistor having a gate coupled to an output of the second negative feedback amplifier, wherein an output of the first output transistor is fed back to the first negative feedback amplifier through a first feedback resistor, wherein the output of the first output transistor is fed back to the second negative feedback amplifier through a second feedback resistor, and wherein the first and second feedback resistors are coupled to the output of the first output transistor.

2. The circuit according to claim 1, wherein the internal power source voltage, in a normal case where the main regulator generates the internal power source voltage less than or equal to the first voltage, is less than the internal power source voltage in the failure.

3. The circuit according to claim 1, wherein the internal power source voltage suppressed to the voltage less than or equal to the second voltage in the failure, is less than or equal to an absolute maximum rating voltage of a low withstand element included in the logic circuit.

4. The circuit according to claim 1, wherein the voltage detecting circuit includes an overvoltage detecting circuit and a low voltage detecting circuit, wherein the overvoltage detecting circuit outputs the failure to the logic circuit when detecting the failure, and wherein when detecting a second failure that the internal power source voltage is less than a predetermined third voltage, the low voltage detecting circuit outputs the second failure to the logic circuit.

5. The circuit according to claim 1, wherein the first feedback resistor is a variable resistor capable of making the internal power source voltage, which the main regulator generates, larger than the first voltage.

6. The circuit according to claim 1, wherein the sub regulator includes a current detecting circuit which detects a current of the second negative feedback amplifier.

7. The circuit according to claim 1, wherein the second feedback resistor is a variable resistor capable of making the internal power source voltage, which the main regulator generates, larger than the output voltage which the sub regulator generates.

8. The circuit according to claim 1, wherein the sub regulator includes:

a detecting transistor to which an output of the second negative feedback amplifier is coupled, and an overcurrent detecting circuit which detects overcurrent from an output of the detecting transistor.

9. The circuit according to claim 1, wherein a reference voltage used in the first negative feedback amplifier is independent of a reference voltage used in the second negative feedback amplifier.

10. The circuit according to claim 1, further comprising an ADC which detects the internal power source voltage.

11. The circuit according to claim 1, wherein the second feedback resistor is a ladder resistor, and wherein the voltage detecting circuit detects the internal power source voltage through the ladder resistor.

* * * * *